United States Patent

[11] 3,624,403

| [72] | Inventor | Maurice Koulicovitch |
| | | Geneva, Switzerland |
| [21] | Appl. No. | 2,524 |
| [22] | Filed | Jan. 30, 1970 |
| [45] | Patented | Nov. 30, 1971 |
| [73] | Assignee | Societe Genevoise D'Instruments de Physique |
| | | Geneva, Switzerland |
| [32] | Priority | Dec. 10, 1969 |
| [33] | | Switzerland |
| [31] | | 3148/69 |

[54] METHOD ENABLING TO LINEARIZE THE DISPLAY OF A PHOTOELECTRIC MICROSCOPE HAVING A SINUSOIDAL SCANNING
6 Claims, 4 Drawing Figs.

[52] U.S. Cl..................................................... 250/214,
356/142

[51] Int. Cl........................................................ H01j 39/12
[50] Field of Search............................................ 250/206,
236, 219 LG, 219 WP, 214, 208; 356/150, 142, 152

[56] References Cited
UNITED STATES PATENTS

| 2,705,901 | 4/1955 | Sherwin.......................... | 250/206 |
| 3,070,700 | 12/1962 | Budnick.......................... | 250/236 |

Primary Examiner—James W. Lawrence
Assistant Examiner—D. C. Nelms
Attorney—Young & Thompson ABSTRACT: This invention relates to the linearization of the display of a photoelectric microscope.
According to this method the integrator of the electronic part of the photoelectric microscope is fed by means of a bistable circuit with a current which varies in function of the time.

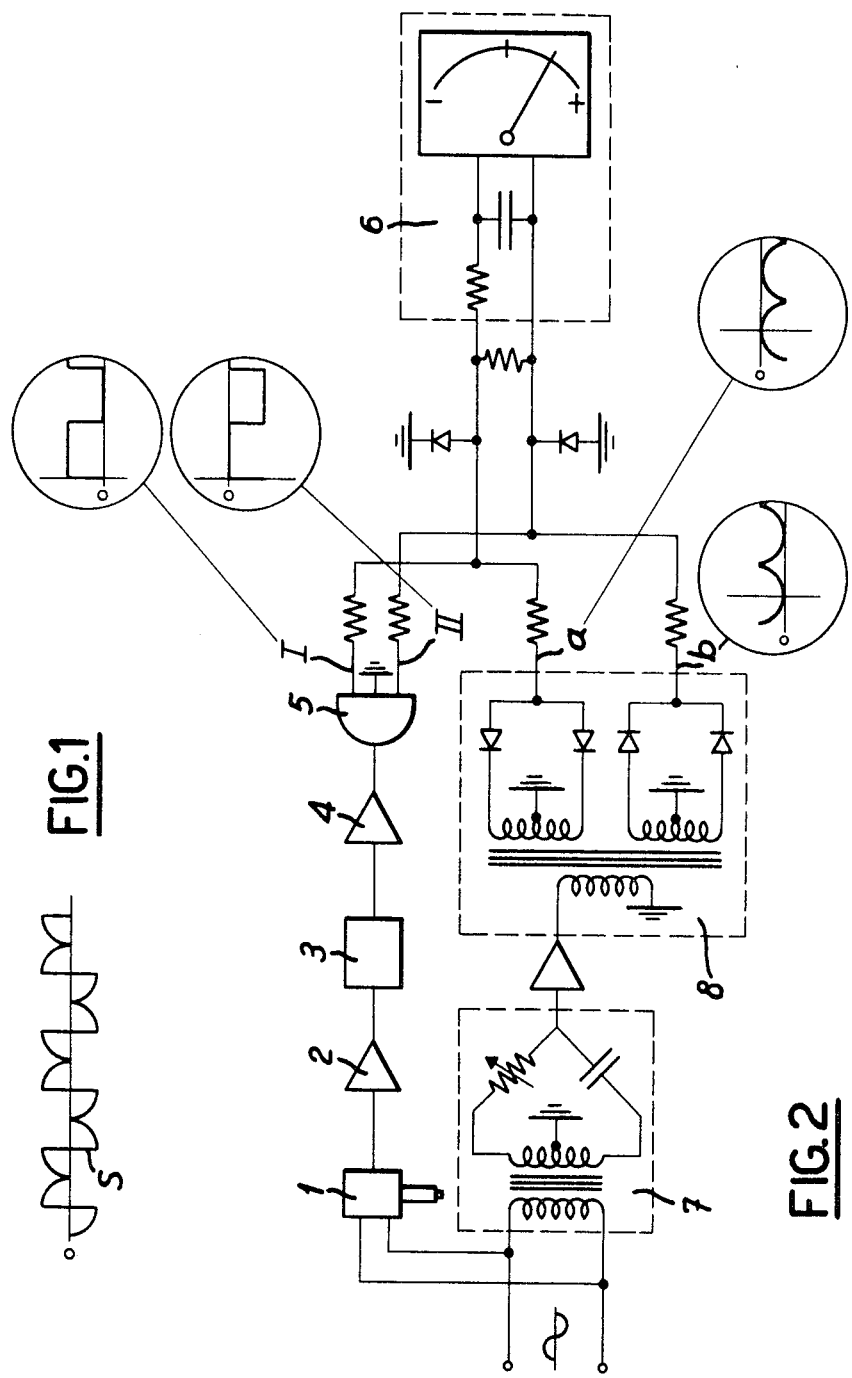

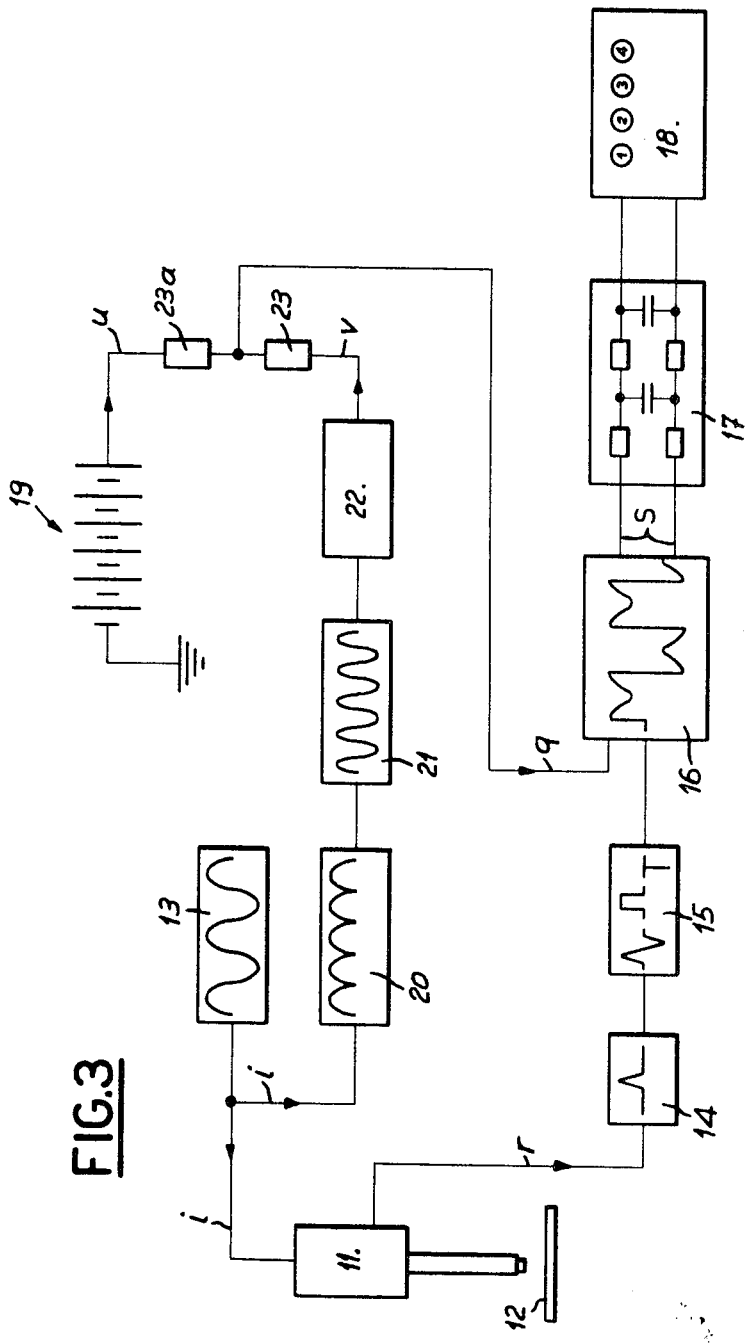

METHOD ENABLING TO LINEARIZE THE DISPLAY OF A PHOTOELECTRIC MICROSCOPE HAVING A SINUSOIDAL SCANNING

The object of the present invention is to provide a method and apparatus adapted to produce a display of a photoelectric microscope of high precision for the reading of a precision ruler proportional to the deviation of the sighted stroke. Such a photoelectric microscope comprises an optical sighting device, a deflector oscillating periodically, in a sinusoidal movement, a beam of incident rays on both sides of a middle position, as well as a photoelectric cell receiving the beam of rays reflected from the precision ruler and controlling an electronic indicating device in accordance with the relative position of a stroke of the graduation of the ruler and the middle position of the optical axis.

This type of photoelectric microscope is known and described for example in the Swiss Pat. No. 280,542 and is satisfactory only as long as the amplitude of the oscillation of the incident rays is sufficient with respect to the order of magnitude of the deviation to be measured so that the portion of the scanning sinusoide which is used may be assimilated to a straight line. In effect, it is only under this condition that a satisfactory proportionality between the position of the sighted stroke and the reading on the indicating instrument may be obtained.

On the contrary, when the deviation to be measured is relatively great with respect to the scanning amplitude, the displacement of the indicating member is not proportional to the deviation between the sighting axis and the index stroke.

One of the simplest of the well-known means to display the sighting deviations from a photoelectric microscope is to control a bistable circuit by the direct and return signals which are emitted by the scanning photoelectric microscope. The symmetrical or asymmetrical currents delivered by the bistable circuit are integrated and deliver a negative null or positive voltage, which is a function of the deviation with respect to the sighting axis.

This widely used system is simple and extremely sensitive while it is stable, can be used as well for the analogical display as the digital display, by means of a numerical voltmeter, and can be used to effect position control. However, this system has a fundamental drawback, namely that the scanning is nearly always obtained by a sinusoidal movement and its action is not linear.

To deflect an image, it is necessary to displace mechanically an element (mirror, plan-parallel glass or other) which has a certain inertia and it is extremely difficult to give it enormous accelerations to force it to cover a back and forth travel with a constant speed.

It is much easier to have a resiliently suspended element oscillating freely. The movement which is obtained is a movement with sinusoidal speed, which is a drawback, but it has the advantage of being more repetitive than in the case of an artificially forced movement which tends to be linear. The drawback which is attached to the movement with variable speed, is that the integrator which is charged by the pulses of the current delivered by the bistable circuit, is not charged in a manner which is proportional to the deviation of position of the stroke of the ruler with respect to the optical axis.

In fact, this image which explores the field to be measured takes a certain time to cross the distance which separates the position of the optical axis from the position where the stroke is. If the stroke is near the optical axis the time will be relatively short, if it is farther away the time will be longer, but not proportional to the distance since the image slows down as it goes further away and stops at the end of the stroke to come back after having reversed its displacement direction. It passes then through the same position of the same stroke. In short more time is necessary to reach the position farther away than it would be the case if the speed would be constant. But, the integrator fed by a bistable circuit delivering during the time it is open a constant current is charging proportionally to the elapsed time.

This implies that the charge of the condenser rises quicker than the displacement of the stroke and that discharge is consequently not proportional to the deviation.

The voltage which appears at the connections of the integrator and which is displayed by the voltmeter, increases more rapidly than the deviation of the stroke with respect to the optical axis.

The aim of this invention, is to charge the integrator by means of the bistable circuit in such a manner as to compensate for the above-described effect, so that the values which are displayed will be proportional to the deviation.

Knowing that the charge depends on the time and the current it is necessary to modify the current feeding the bistable circuit in function of the time so that the charge becomes at each moment proportional to the deviation. Since the scanning movement is slowing down in going away and stops at the end of the stroke, it is necessary that the charging current diminishes and comes to zero at the same time.

The present invention has for its object a method to render the display of a photoelectric microscope having a sinusoidal scanning proportional to the displacement comprising a bistable circuit controlled by the pulses delivered by a photoelectric cell and an integrating device delivering a display voltage, characterized by feeding the integrator device with a bistable circuit the feeding current of which varies in function of the time.

The attached drawing shown schematically and by way of example two embodiments of a device for carrying out a method according to the invention.

FIG. 1 shows the shape of a feeding current for a bistable circuit so that taking in account a sinusoidal movement of a deflector the desired display of the output signal of this bistable circuit is linear.

FIG. 2 shows schematically one embodiment to carry out the method as well as the shapes of the current in several points of the diagram.

FIG. 3 is a block diagram of a second embodiment to carry out the method.

Figure 4:
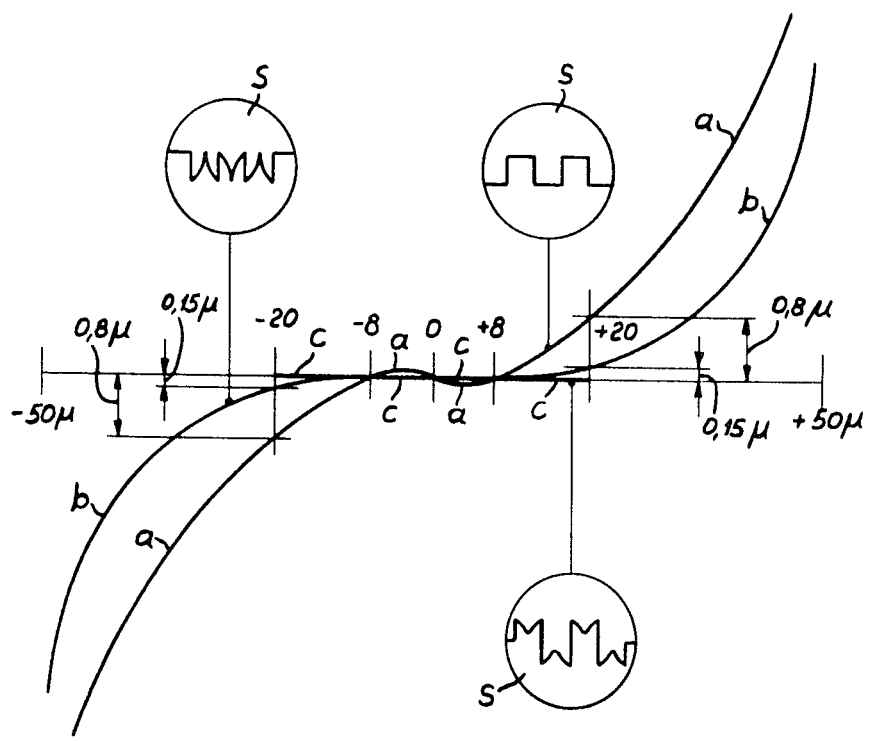
FIG. 4 shows different response curves of a photoelectric microscope.

The present method consists in modulating or modifying the current or the charging voltage of the integrator of the electronic device of the photoelectric microscope so that the ratio between the charge and the displacement is always proportional.

In practice, it is possible to feed a bistable circuit with a current the shape of which is discontinuous. It is, however, preferable to connect between the bistable circuit and the integrator of the electronic device of the photoelectric microscope a correcting element which modifies the rectangular shape of the current of the usual bistable circuit.

FIG. 2 shows that the shape of the charging current may be obtained by a succession of additions and cutout.

The electronic device of the photoelectric microscope 1 comprises a first amplifier 2, a shaping device for the pulses 3, a second amplifier 4 feeding a bistable device 5 and an integrator 6 for the display.

The bistable device 5 which provides rectangular voltages is usually a double bistable circuit and may always be considered as such by adding middle connections. Consequently the signals I and II appear on separate terminals. The voltages $a$ and $b$ are derived from a stabilized alternating current which is filtered, phase shifted in 7 and rectified in 8. The additions or signal combinations achieved to obtain the charging signal S from the signals I and II and the voltages $a$ and $b$ are made according to conventional methods as well as the rectifications.

It is impossible to extend the measured field up to the limits of the scanned field since the signals are altered and enlarged too much when the linear speed gets too slow. Therefore the compensation of the linearity described hereabove, theoretically effective in the whole scanned field, will actually be used in the measured field only, which is reduced, but nevertheless larger than usual. Deviations to be compensated are then relatively reduced. A correspondence in shape, in phase, or in amplitude which would not be regular between the rectified voltage and the theoretical voltage, would only change to a small extent the absolute correction, and the resulting deviation will easily remain lower than the displayed possibilities which are in any case limited due to other factors (stability, background noise, need of the signal).

Practical tests have shown that if the curve of response of a photoelectric microscope the integrator of which is fed by square waves (curve $a$ of the FIG. 4) is not at all proportional to the deviation, the solution described hereabove provides an increase in this linearity in great proportion (curve $b$ of FIG. 4) but does not give a perfect solution.

The object of the second embodiment for carrying out the described method is to give the perfect solution, that is to say to render the display of the photoelectric microscope strictly proportional to the displacement to be measured.

This is obtained when one replaces the charging current S described hereabove with a DC current modulated at 50 percent with a sinusoidal current the frequency of which is twice the one of the scanning of the photoelectric microscope and the phase of which is set to create a decrease of the DC current near the center of the square pulses.

In this manner the display is strictly proportional to the displacement to be measured as it can be seen by the curve C of FIG. 4. This FIG. 4 gives in fact in microns the deviation between the real displacement and its display. One sees that for a total scanning of ±50 $\mu$, the display is strictly proportional to the displacement, at least in a measuring field of ±20 $\mu$.

The second embodiment to carry out the method is shown schematically at FIG. 3 in which the photoelectric microscope 11 can be seen which is sighting a standard ruler 12, said microscope having a deflector fed by a sinusoidal current $i$ delivered by a frequency generator 13. The signal $r$ delivered by the photoelectric cell of the photoelectric microscope is amplified in 14 then shaped in 15 and is used to control the bistable circuit 16 which feeds an integrator delivering the display signal to a numerical voltmeter 18 in the embodiment shown.

These elements are well known and generally used in the existing photoelectric microscope so that they will not be described in detail here. To realize the method described hereabove it is necessary to feed the integrator 17 with a charging current S which has a particular shape. This particular current is obtained by the configuration of the feeding current $q$ of the bistable circuit 16. This current $q$, which is variable within the time, is obtained through modulation at 50 percent of a DC current $u$, delivered by a source 19, by a sinusoidal AC current $v$ the frequency of which is twice the one of the scanning of the photoelectric microscope and thus of the current $i$ feeding the deflector.

The current $v$ is obtained by rectifying the current $i$ in 20 and in filtering it in 21 to take only the component of it having a double frequency. The signal thus obtained is set in phase in 22 by means of a phase shifter so that, once mixed with the DC current $u$ in the mixer constituted by the resistors 23, 23$a$ of equal value, and interrupted by the bistable circuit 16, it creates the decrease of the DC current near the center of the square pulses. The best result is obtained when the maximum decrease of the charging current S is centered on the squares, however, this adjustment is not critical.

In certain cases it is advantageous to feed the bistable circuit 16 through a primary bistable circuit (not shown) to avoid an unwanted changing of stay of the bistable circuit 16 for example due to the passage to zero of the feeding current of this bistable circuit 16.

I claim:

1. In a scanning photoelectric microscope for measuring displacement having an oscillating substantially sinusoidal scan and a bistable output circuit controlled by electrical signals emitted by the scanning microscope to normally provide rectangular output signals of varying duration to charge an integrator, a method for rendering a display derived from the integrator output substantially proportional to the displacement measured by said microscope which includes modifying the output signals of said bistable output circuit to provide integrator charging signals which diminish in amplitude with each reduction in speed of said microscope scan at the end of each scanning stroke.

2. The method of claim 1 which includes mixing the output signals from said bistable output circuit with rectified pulse signals of opposite sign to diminish the amplitude of said integrator-charging signals with each reduction in speed of said microscope scan.

3. The method of claim 2 which includes providing pulse signals of sufficient amplitude to reduce said integrator-charging signals to a zero current level.

4. The method of claim 1 which includes feeding the electrical signals emitted by said scanning microscope to the input of said bistable output circuit and also feeding said bistable output circuit with a DC current which is modulated by a sinusoidal AC current of a frequency which is twice the scanning frequency of the photoelectric microscope.

5. The method of claim 4 wherein said DC current is modulated at 50 percent with said sinusoidal AC current.

6. In a scanning photoelectric microscope for measuring displacement having an oscillating substantially sinusoidal scan and a bistable output circuit controlled by electrical signals emitted by the scanning microscope to normally provide rectangular signals of varying duration to charge an integrator, a circuit for rendering a display derived from the integrator output substantially proportional to the displacement measured by said microscope comprising DC source means to provide a DC current, AC source means to provide a sinusoidal AC current of a frequency which is twice the scanning frequency of said photoelectric microscope and modulation means for modulating said DC current with said AC current to provide a modulated signal to said bistable output circuit and means to apply the modulated signal to the integrator.

* * * * *